United States Patent
Courtney et al.

(10) Patent No.: US 6,986,155 B1
(45) Date of Patent: Jan. 10, 2006

(54) METHODS AND APPARATUS FOR SELECTING MULTICAST IP DATA TRANSMITTED IN BROADCAST STREAMS

(75) Inventors: Jonathan D. Courtney, San Jose, CA (US); Jesus David Rivas, San Francisco, CA (US); Tao Ye, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 695 days.

(21) Appl. No.: 09/614,617

(22) Filed: Jul. 12, 2000

Related U.S. Application Data (60) Provisional application No. 60/194,569, filed on Apr. 4, 2000, provisional application No. 60/143,428, filed on Jul. 13, 1999.

(51) Int. Cl.
*H04N 7/173* (2006.01)
(52) U.S. Cl. .............................. 725/87; 725/89; 725/93; 725/98; 725/109; 725/110; 725/112
(58) Field of Classification Search ................. 725/48, 725/49, 51, 54, 109–110, 112–113, 40, 59, 725/90, 95, 98, 100, 117–118, 131, 136, 139, 725/151; 370/485–487
See application file for complete search history.

(56) References Cited

U.S. PATENT DOCUMENTS

| | | | | |
|---|---|---|---|---|
| 5,982,411 A | * | 11/1999 | Eyer et al. ..................... 725/49 |
| 6,240,555 B1 | * | 5/2001 | Shoff et al. .................. 725/110 |
| 6,351,467 B1 | * | 2/2002 | Dillon ......................... 370/432 |
| 6,400,407 B1 | * | 6/2002 | Zigmond et al. ........... 348/465 |
| 6,459,427 B1 | * | 10/2002 | Mao et al. ................... 725/109 |
| 6,510,557 B1 | * | 1/2003 | Thrift .......................... 725/110 |
| 6,580,722 B1 | * | 6/2003 | Perlman ...................... 370/432 |
| 6,856,967 B1 | * | 2/2005 | Woolston et al. ............. 705/26 |

(Continued)

FOREIGN PATENT DOCUMENTS

EP         0 844 766        5/1998

(Continued)

OTHER PUBLICATIONS

Clausen, et al., "MPEG-2 As A Transmission System for Internet Traffic", IEEE International Performance, Computing and Communications Conference, US, New York, NY: IEEE, Feb. 1998, pp. 101-107.

(Continued)

*Primary Examiner*—Kieu-Oanh Bui
(74) *Attorney, Agent, or Firm*—Beyer Weaver & Thomas LLP (57) ABSTRACT

Through the association of an IP address with each data stream, a single system may be used by a network card or a tuner to select multicast IP data. Each data stream is identified by a unique IP address. More particularly, a locator adapted for identifying a data stream is associated with one of a plurality of data streams. The locator is then mapped to an IP address. When it is determined that the IP address corresponds to a data stream locator associated with a data stream, a tuner is instructed to read the data stream associated with the data stream locator. However, when it is determined that the IP address does not correspond to a data stream locator, a network card identified by the IP address is instructed to read data from the associated network. Since each data stream may be associated with a plurality of multicast IP addresses, a multicast group address is specified to identify the appropriate multicast IP data transmitted in the data stream. Packets addressed to the multicast group address may then be received by either a tuner or a network interface card.

27 Claims, 8 Drawing Sheets

U.S. PATENT DOCUMENTS

2002/0038383 A1 * 3/2002 Ullman et al. .............. 709/245
2002/0061021 A1 * 5/2002 Dillon ........................ 370/390

FOREIGN PATENT DOCUMENTS

WO      WO 97/20413      6/1997

OTHER PUBLICATIONS

"Java TV API Specification", Sun Microsystems, Inc., Preliminary Draft 0.5.2, pp. 1-45. (was available on the Internet on approximately Jun. 14, 1999, not earlier than Jun. 1, 1999, and was provided to the standards body on May 12, 1999).

S. Deering, "Host Extensions for IP Multicasting", Network Working Group, Stanford University, RFC 1112, Aug. 1989, pp. 1-17.

Y. Rekhter, et al., "Address Allocation for Private Internets", Network Working Group, Silicon Graphics, Inc., RFC 1918, Feb. 1996, pp. 1-9.

D. Meyer, "Administratively Scoped IP Multicast", Network Working Group, University of Oregon, RFC 2365, Jul. 1998, pp. 1-8.

* cited by examiner

ETHODS AND APPARATUS FOR SELECTING MULTICAST IP DATA TRANSMITTED IN BROADCAST STREAMS

CROSS REFERENCE TO RELATED APPLICATIONS

This application claims priority of provisional U.S. patent application Ser. No. 60/143,428, filed Jul. 13, 1999, entitled "Java TV API Specification" which is incorporated by reference.

This application claims priority of provisional U.S. patent application Ser. No. 60/194,569, filed Apr. 4, 2000, entitled "Methods and Apparatus for Selecting Multicast IP Data Transmitted in Broadcast Streams" which is incorporated by reference.

BACKGROUND OF THE INVENTION

1. Field of the Invention

The present invention relates generally to computer software. More particularly, the present invention relates to methods and apparatus for selecting multicast data transmitted in broadcast streams.

2. Description of Related Art

The digital television revolution is one of the most significant events in the history of broadcast television. With the advent of digital television, high speed data transfer is possible via satellite, cable and terrestrial television channels. Digital television offers users more channels as well as significantly improved video and audio quality. Most importantly, digital television ushers in the age of true interactive television. For instance, digital receivers will be able to offer users a variety of enhanced services, from simple interactive quiz shows, to internet, and a mix of television and web-type content. As the market for digital television grows, content developers are looking for a feature-rich, cost-effective, and reliable software platform upon which to build the next generation of interactive television services such as Electronic Programming Guides, Video-On-Demand, and Enhanced Broadcasting.

Java is a leading commercial object-oriented language designed as a portable language that can run on any compatible device that supports the JAVA™ PLATFORM. For instance, Java is incorporated into all major Web browsers. Thus, Java runs on any web-enabled computer via that computer's Web browser. As such, Java offers great promise as the software platform for set-top boxes and digital television.

In object-oriented programming, code and data are merged into objects. Each object is defined via its class, which determines the properties and behavior of an object. In other words, objects are individual instances of a class.

In an interactive digital television environment, it will be common to receive data from multiple sources. For instance, a television program (i.e., service) received by a particular channel might consist of audio, video as well as other data (e.g. IP data streams). With the advent of digital television, it would be desirable if the data received by a television receiver could include data from the Internet and therefore conform to the Internet Protocol (IP). Moreover, it would be desirable if each channel could receive data from multiple sources.

When a television channel broadcasts digital data to viewers, it is impossible to address digital data to each viewer individually (e.g., through a single address). Thus, in order to send digital data to multiple television viewers simultaneously, multicast addressing must be used. However, no central repository or mechanism exists to verify that the same multicast address is not used by multiple sources (e.g., channels). It is therefore impossible to distinguish data streams by the associated multicast address. Moreover, it would be desirable to transmit data received from other sources such as those available on the Internet on two different channels. It is therefore possible that the data received by these multiple sources may conflict. This is particularly important since picture-in-picture capability is available in most televisions. As a result, it is possible that conflicting data may be received by multiple channels that are being simultaneously displayed via a picture-in-picture option. Thus, conflicting data may be provided to a single channel through multiple data streams or to multiple channels through a single data stream received by each of the channels. In either case, when this data is ultimately provided to one or more television channels, it would be undesirable if this conflicting data were broadcast to television viewers via the wrong television channel or presented in an incorrect manner by a television channel.

In view of the above, it would be beneficial if a mechanism for unambiguously identifying and selecting one of the data streams associated with a particular channel could be provided. Moreover, it would be desirable if such a mechanism were designed to identify, select, and read a multicast IP data stream transmitted in a broadcast stream, even where multiple data streams are associated with the same multicast address.

SUMMARY

The present invention enables multicast IP data transmitted in broadcast streams to be selected and received. More particularly, a network interface card has an associated IP address. However, a digital television receiver cannot identify a network interface card. Rather, a digital television receiver communicates solely with one or more associated tuners. Thus, through the association of an IP address with each data stream, a single system may be used to read and display data associated with a network card as well as a tuner.

In accordance with one aspect of the invention, each data stream associated with a tuner is identified by a unique IP address. More particularly, a locator adapted for identifying a data stream is obtained, where the locator is associated with one of a plurality of data streams. The locator is then mapped to an IP address. Through the use of this mapping, a digital television receiver may obtain the appropriate locator to read the associated data stream. In this manner each data stream may be uniquely identified, even where multiple data streams are associated with a single multicast address.

In accordance with another aspect of the invention, it is determined whether the IP address corresponds to a data stream locator associated with a data stream. When it is determined that the IP address corresponds to a data stream locator, a tuner is instructed to read the data stream associated with the data stream locator. However, when it is determined that the IP address does not correspond to a data stream locator, a network card identified by the IP address is instructed to read data from its associated network. However, all information in a particular data stream may not be relevant. More particularly, it may be desirable to filter the information in the data stream. Thus, since each data stream may be associated with a plurality of multicast IP addresses, a multicast group address may then be specified to identify the appropriate multicast IP data transmitted in the broadcast stream. Packets addressed to the multicast group address may then be received by either a tuner or a network interface card. Accordingly, a single system may be used to select and receive multicast IP data transmitted in broadcast streams via a network card or a tuner.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
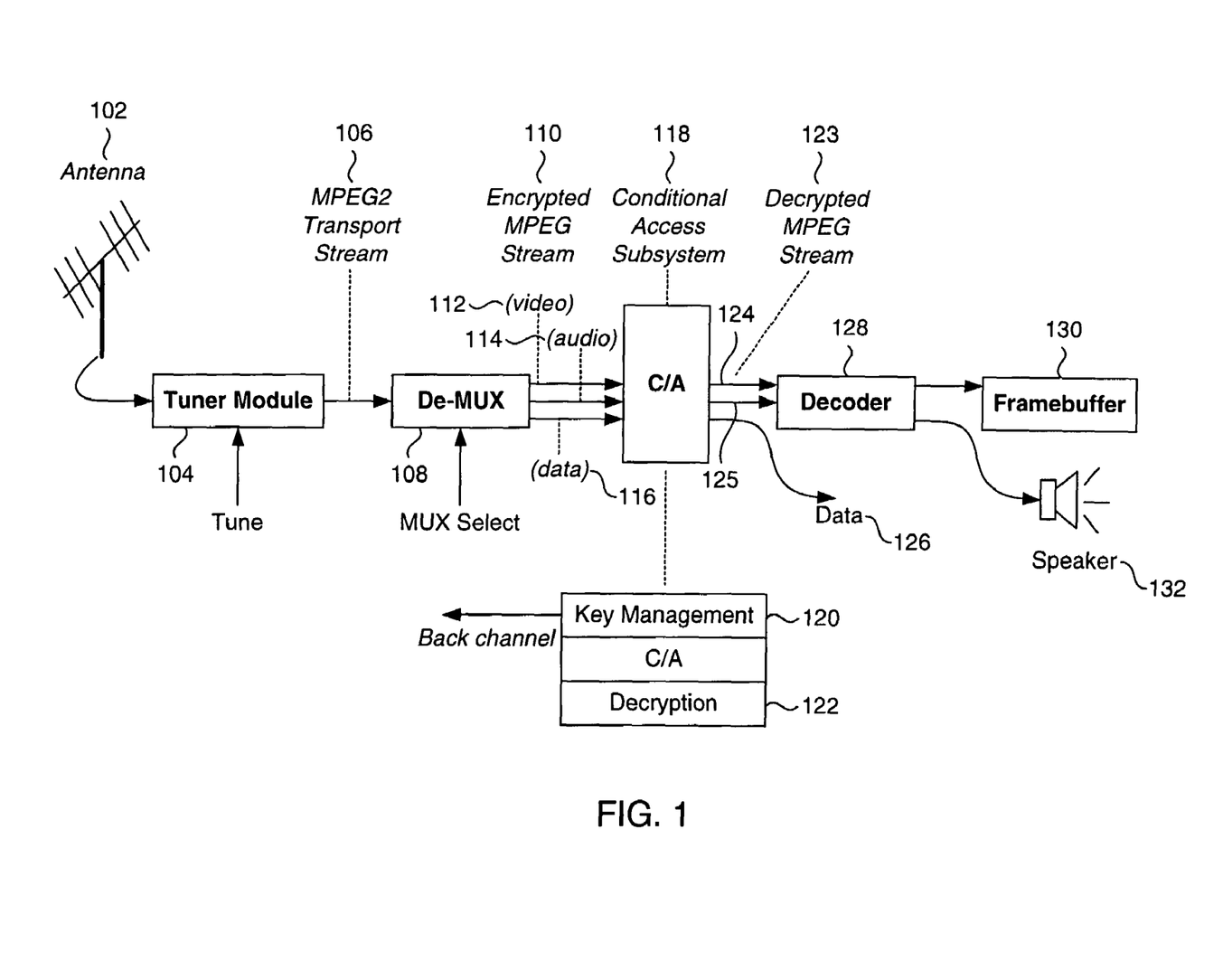
FIG. 1 is a block diagram illustrating a digital television receiver in which the present invention may be implemented.

The invention is described within the context of a digital television and digital television receiver. FIG. 1 is a block diagram illustrating an exemplary digital television receiver. As shown, a signal is received via antenna 102 and tuned by tuner module 104, producing MPEG2 transport stream 106. De-multiplexer 108 then produces encrypted MPEG streams 110 including a video stream 112, an audio stream 114, and one or more data streams 116. These three streams are then processed by conditional access subsystem 118. For instance, the conditional access subsystem 118 may utilize key management information 120 as well as decryption information 122 (e.g., decryption algorithms). The conditional access subsystem 118 produces decrypted MPEG streams 123 including a video stream 124 and audio stream 125 as well as data 126, all of which are decrypted. A decoder 128 then processes the decrypted MPEG stream 123, and forwards the decoded video data to frame buffer 130 and transmits the decoded audio data to speaker 132.

A Java Virtual Machine is one platform that may be used to implement the present invention to process information received by a digital television receiver such as that illustrated in FIG. 1. More particularly, when the data 126 (e.g., broadcast data stream) is processed, it may be desirable to process information such as a downloaded application provided in the data 126. Moreover, each associated service or program provided by a channel may include one or more data streams, as represented by the data 126 as described above with reference to FIG. 1.

Figure 2:
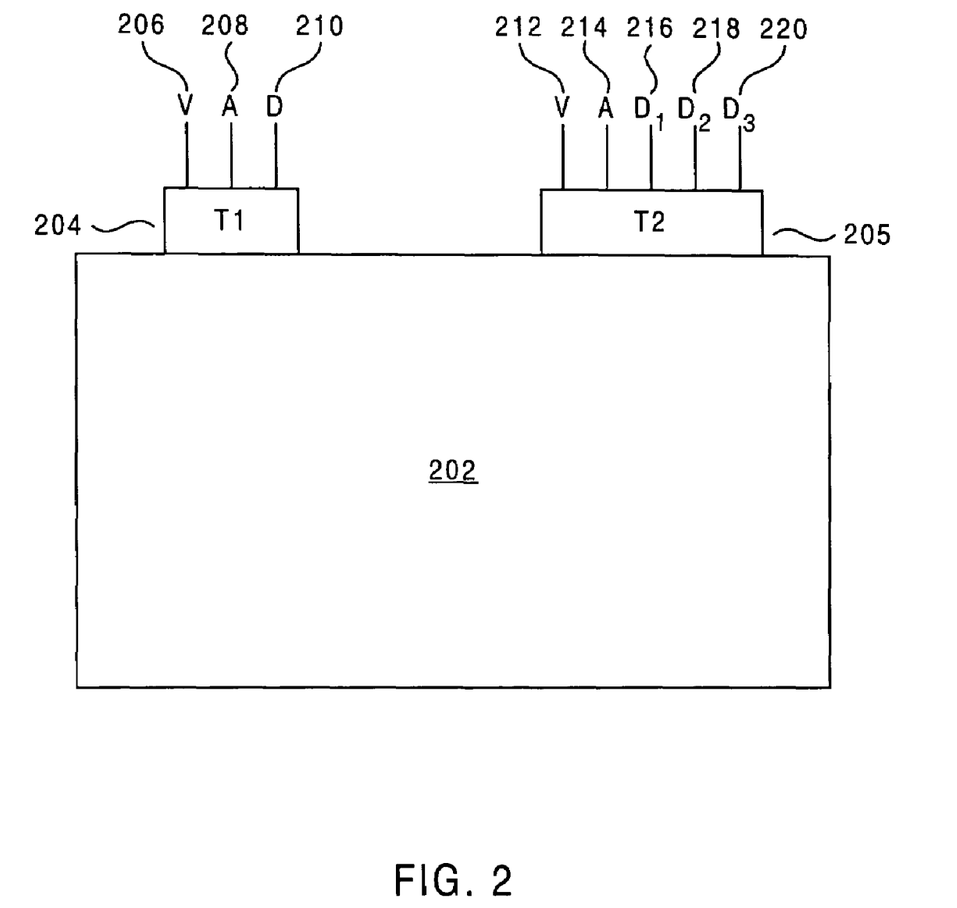
FIG. 2 is a block diagram illustrating a system in which the present invention may be implemented.

FIG. 2 is a block diagram illustrating an exemplary system in which the present invention may be implemented. A digital television receiver 202 is shown to include a first television tuner 204 and a second television tuner 205. A receiver typically requires a tuner for each different picture (e.g., picture-in-picture) provided. Thus, when a receiver includes two or more tuners, multiple channels may be simultaneously be available to a television viewer. As shown, the first tuner 204 has an associated video stream 206, audio stream 208 and data stream 210. Similarly, the second tuner 205 has an associated video stream 212, audio stream 214, and a first data stream 216, a second data stream 218 and a third data stream 220. Thus, the second tuner 205 has three associated data streams. It would be desirable if the data streams received by the television receiver could include Internet Protocol (IP) formatted data. However, as described above, since multiple sources of data may be using the same multicast group address, it is necessary to distinguish the data streams from one another.

Figure 3:
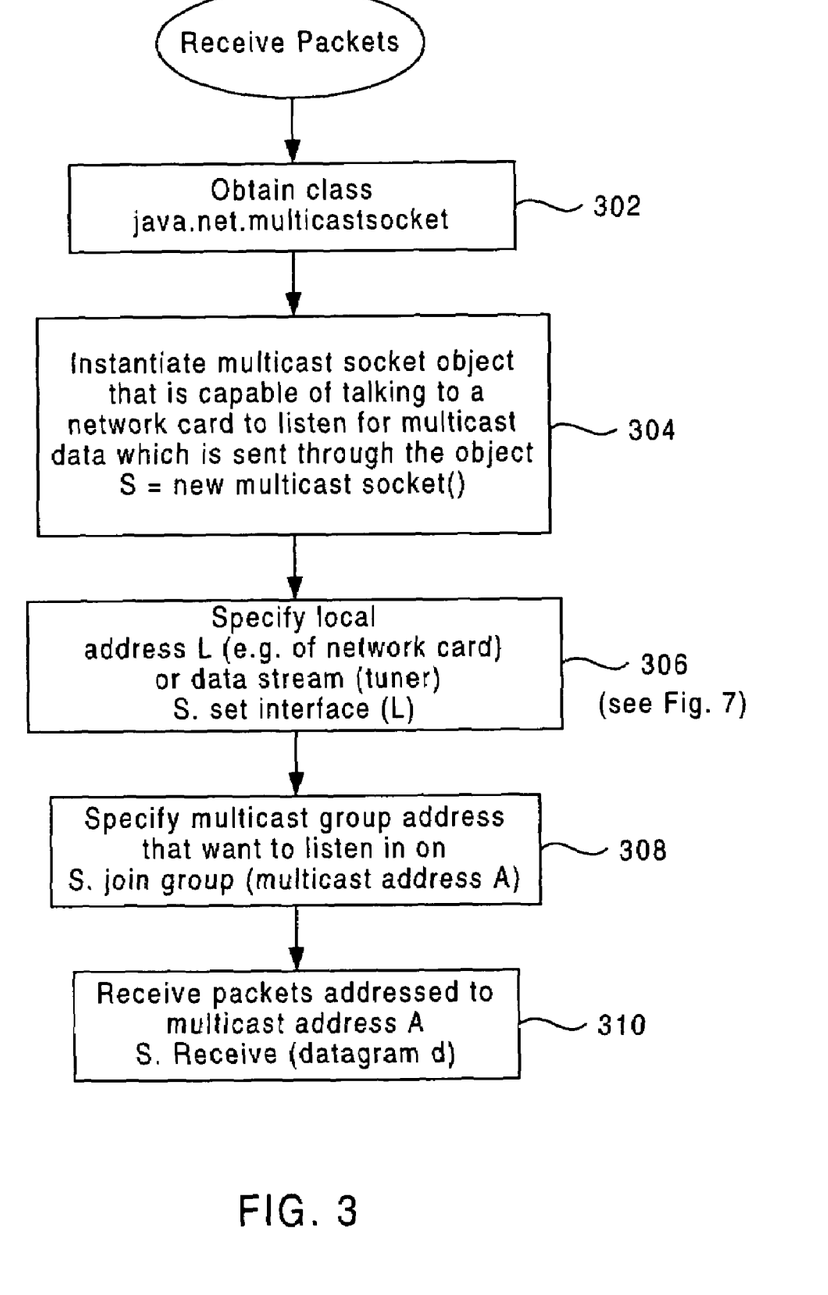
FIG. 3 is a process flow diagram illustrating a method of receiving packets addressed to a multicast address in accordance with an embodiment of the invention.

FIG. 3 is a process flow diagram illustrating a method of receiving packets addressed to a multicast address in accordance with an embodiment of the invention. In accordance with one embodiment, a method of selecting multicast IP data transmitted in broadcast streams is implemented through the customization and modification of a method of receiving packets by a network card. First, a Java.net.multicastsocket class is obtained at block 302. Next, a multicast socket object capable of listening for multicast data which is sent through the object is instantiated at block 304. More particularly, the object includes a method for specifying an IP address, a method for specifying a multicast group address to listen in on, and a method for receiving packets addressed to the multicast address. These methods are then called in blocks 306 through 310. At block 306, the method for specifying an IP address is called. More particularly, the method instructing a tuner to read a data stream associated with the IP address when the IP address corresponds to a data stream locator, and otherwise instructs a network card to read data from the network. One method of specifying an IP address is described in further detail below with reference to FIG. 7. Next, at block 308, the method for specifying a multicast group address is called to specify a multicast group address associated with the IP address (e.g., data stream). The method for receiving packets addressed to the multicast group address is then called at block 310. Garbage collection may then be performed for the multicast object when it is no longer being used.

Figure 4:
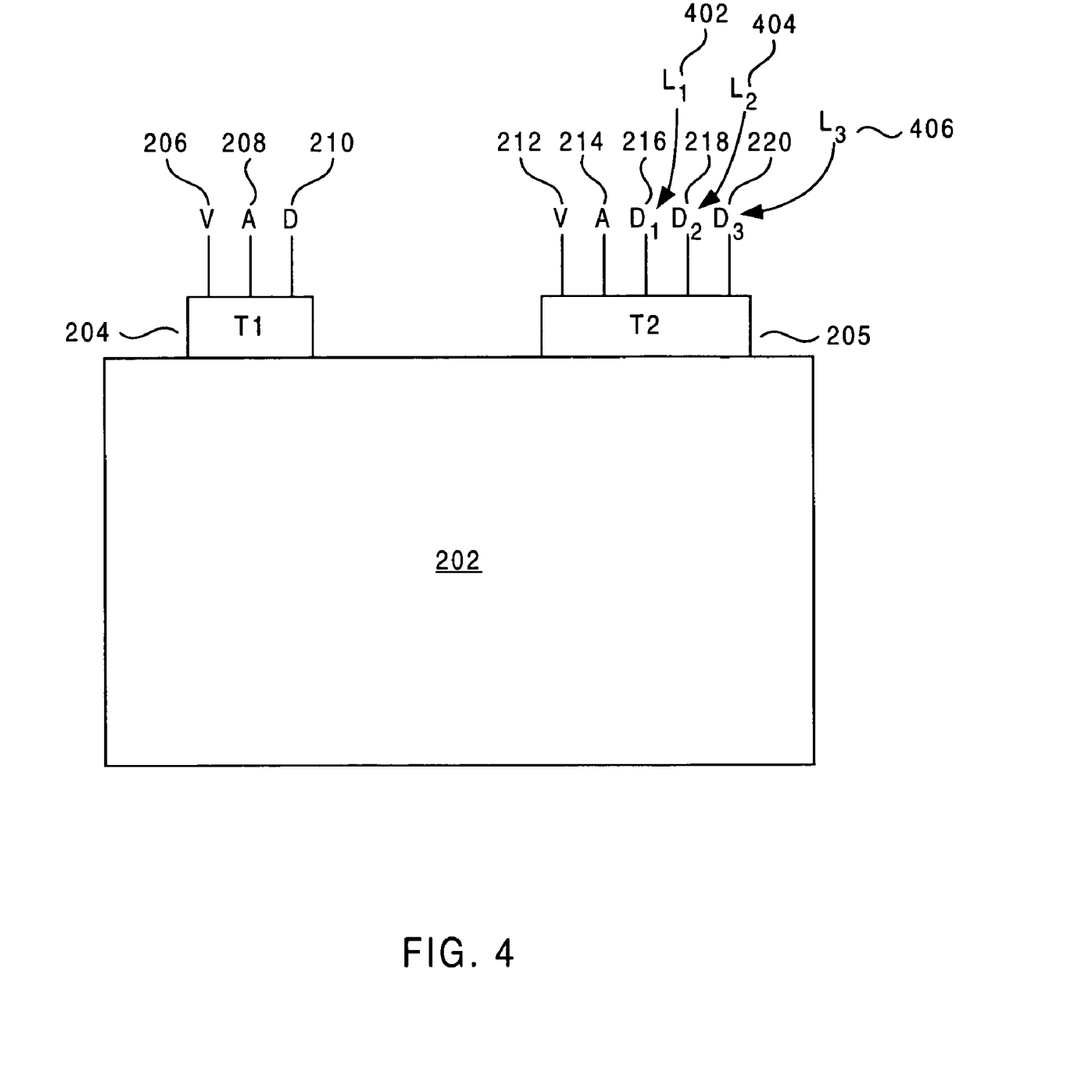
FIG. 4 is a diagram illustrating the use of locators to identify data streams in accordance with an embodiment of the invention.
Figure 5:
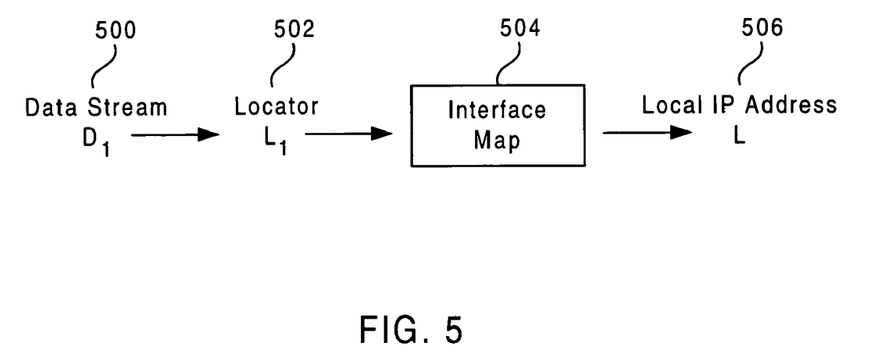
FIG. 5 is a diagram illustrating the use of an interface map to map a data stream to an IP address through the use of a locator in accordance with an embodiment of the invention.
Figure 6:
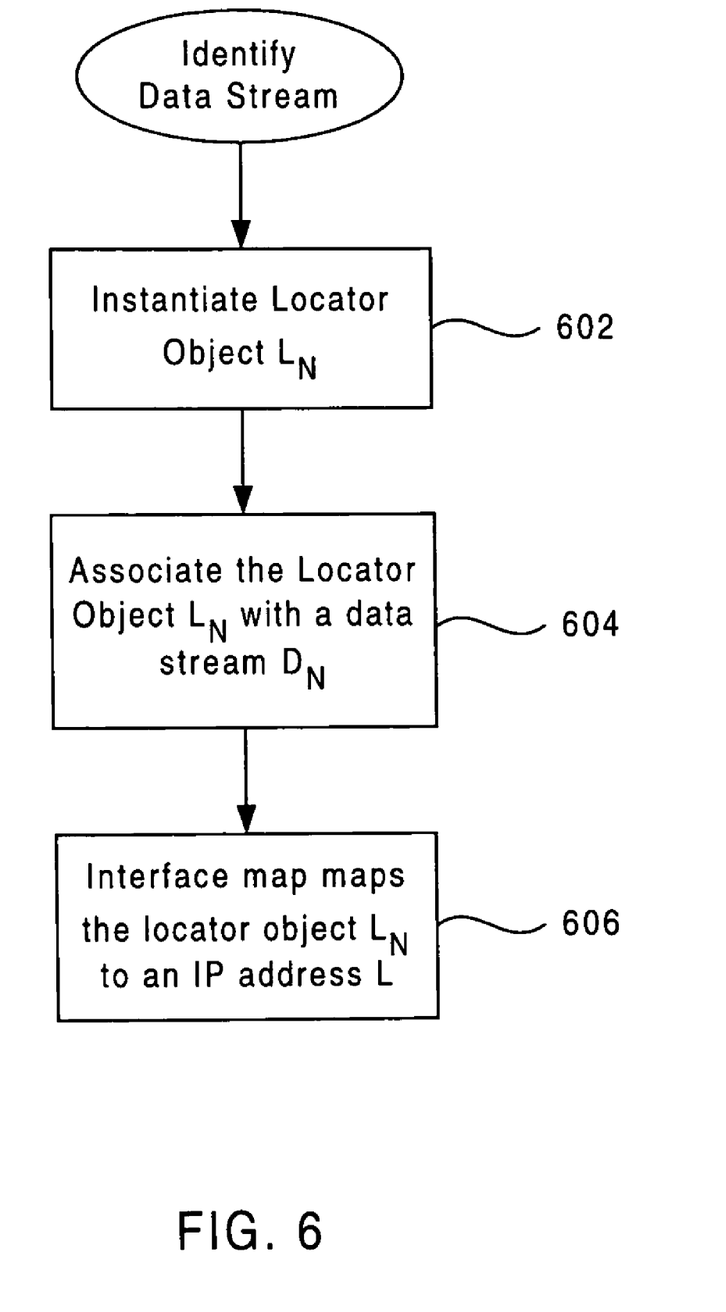
FIG. 6 is a process flow diagram illustrating a method of identifying a data stream using an interface map such as that illustrated in FIG. 5.

Through the modification of the method of specifying an IP address (i.e., via a set interface method) described above at block 306, multicast IP data may be received by a tuner as well as a network card. When the set interface method is called, an IP address is provided to the set interface method. More particularly, the IP address corresponds either to a network interface card or the IP address corresponds to a data stream. When the IP address is associated with a data stream rather than a network interface card, the appropriate IP address must be obtained. Thus, even when multiple sources are transmitting on the same multicast group address, the present invention enables each data stream to be uniquely identified. FIGS. 4 through 6 illustrate a mechanism for mapping an IP address to a data stream in order to uniquely identify that data stream, even where multiple data streams are associated with the same multicast group address.

FIG. 4 is a diagram illustrating the use of locators to identify data streams in accordance with an embodiment of the invention. As described above, multiple data streams 216, 218, and 220 may be associated with a single multicast IP address. In order to distinguish the data streams 216, 218 and 220 from one another, a locator adapted for identifying a data stream is associated with each of the data streams 216, 218 and 220, as shown at L1 402, L2, 404, and L3 406, respectively. Each of the data streams 216, 218 and 220 may be associated with the same channel or a different channel.

In accordance with one embodiment of the invention, an interface map is used to create a one-to-one mapping between each data stream and an associated local IP address. Thus, even where data streams are associated with the same multicast IP address, the data streams may be uniquely identified through the associated local IP addresses. FIG. 5 is a diagram illustrating the use of an interface map to map a data stream to an IP address through the use of a locator in accordance with an embodiment of the invention. As shown, for a particular data stream D1 500, a locator L1 502 is obtained. For instance, the locator 502 may be a locator object that has been obtained from an outside source. Alternatively, the locator 502 may be instantiated internally by an interface map 504. Once the interface map 504 has obtained the locator 502, a local IP address L 506 is generated and mapped to the locator L1 502. For instance, the local IP address L 506 may be obtained from a pool of available IP addresses. Thus, through the use of the interface map 504, a one-to-one correspondence is created between each data stream and a local IP address.

FIG. 6 is a process flow diagram illustrating a method of identifying a data stream using an interface map such as that illustrated in FIG. 5. As shown, a locator is obtained at block 602. For instance, a locator object may be instantiated or obtained from another source. The locator is then associated with one of a plurality of data streams at block 604, each one of the plurality of data streams being associated with one of a plurality of television channels. For instance, the data streams may be associated with the same channel or different channels. An interface map such as that illustrated in FIG. 5 is then used to map the locator to an IP address at block 606. For instance, the IP address may be generated from a set of local IP addresses reserved for use in private networks. The locator object may then be garbage collected when it is no longer used. In this manner, data streams associated with one or more tuners may be identified.

Figure 7:
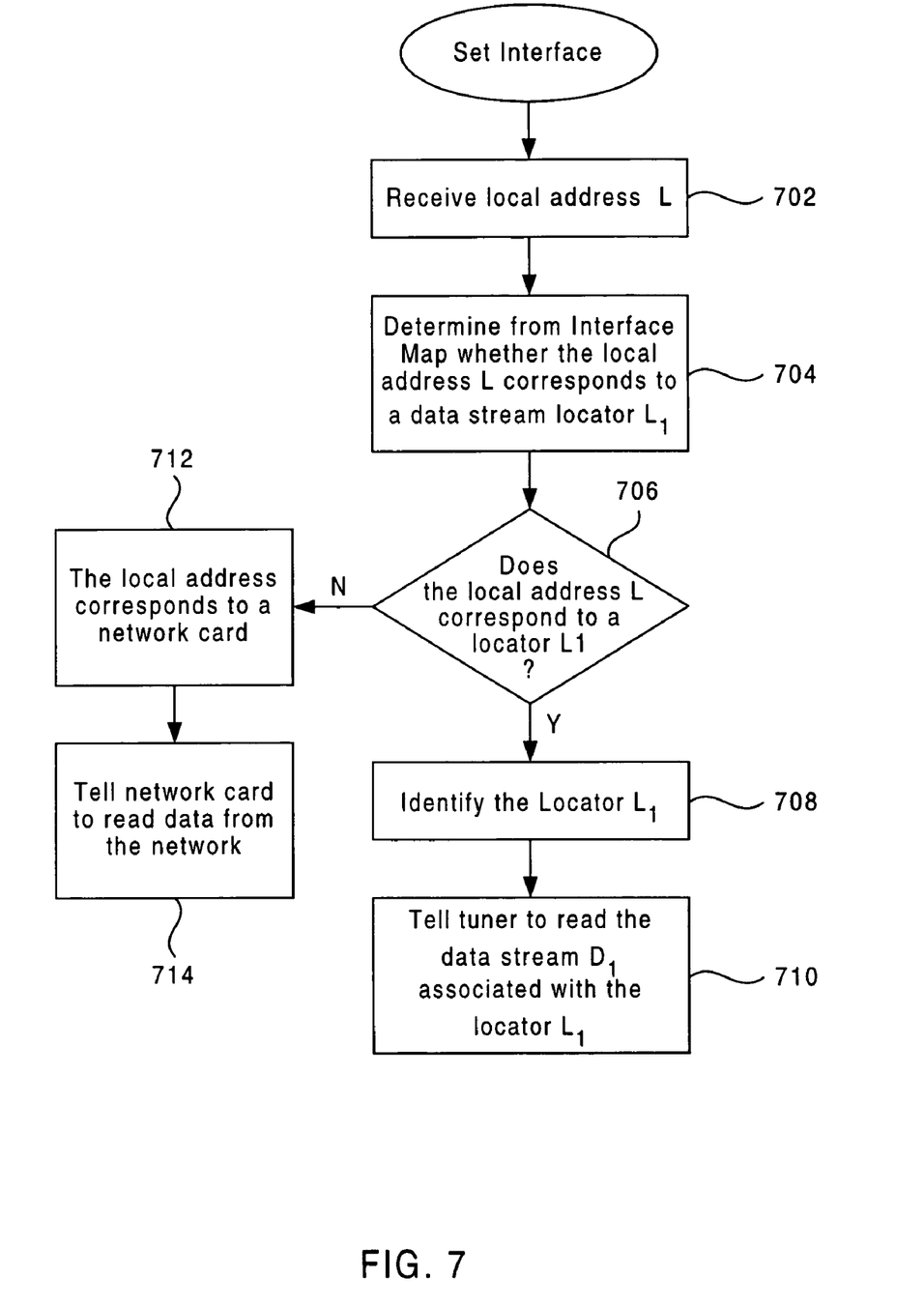
FIG. 7 is a process flow diagram illustrating a method of performing the set interface method shown at block 306 of FIG. 3 in accordance with an embodiment of the invention.

Once the IP address associated with the data stream locator is obtained from the interface map, the address may be used to specify the local IP address via the set interface method as shown at block 306 of FIG. 3. FIG. 7 is a process flow diagram illustrating a method of performing the set interface method shown at block 306 of FIG. 3 in accordance with an embodiment of the invention. Once a local IP address is obtained at block 702, it is determined from the interface map whether the local IP address corresponds to a data stream locator associated with a data stream at block 704. At block 706, when it is determined that the IP address corresponds to a data stream locator associated with a data stream, the data stream associated with the data stream locator is selected. More particularly, the digital television receiver may use the locator to read the associated data stream. Thus, the locator is identified at block 708 and a tuner is instructed to read the data stream associated with the locator at block 710. For instance, the tuner may be a tuner that is tuned to the data stream or it may simply be a tuner that is currently unused. When it is determined at block 706 that the IP address does not correspond to a data stream locator, the local address corresponds to a network card as shown at block 712 and the network card is instructed to read data from the network at block 714. When the IP address is no longer being used to read the data stream, the IP address may be released for future use. For instance, the interface map may be instructed to release the IP address for future use when it is no longer in use.

Although the IP address has been specified, there may be multiple multicast addresses associated with the IP address. Thus, once the tuner or network card has been instructed to read the data identified by the IP address, a multicast group address associated with the IP address is specified as described above with reference to block 308. Packets addressed to the multicast address may then be received as shown at block 310.

Through the use of the present invention, an IP address may be used to specify a network card or a data stream associated with a tuner. In this manner each data stream may be uniquely identified, even where multiple data streams are associated with a single multicast address. Moreover, through the mapping of an IP address to each data stream, an existing system which is capable of reading data associated with a network card may easily be modified for use with a tuner.

Figure 8:
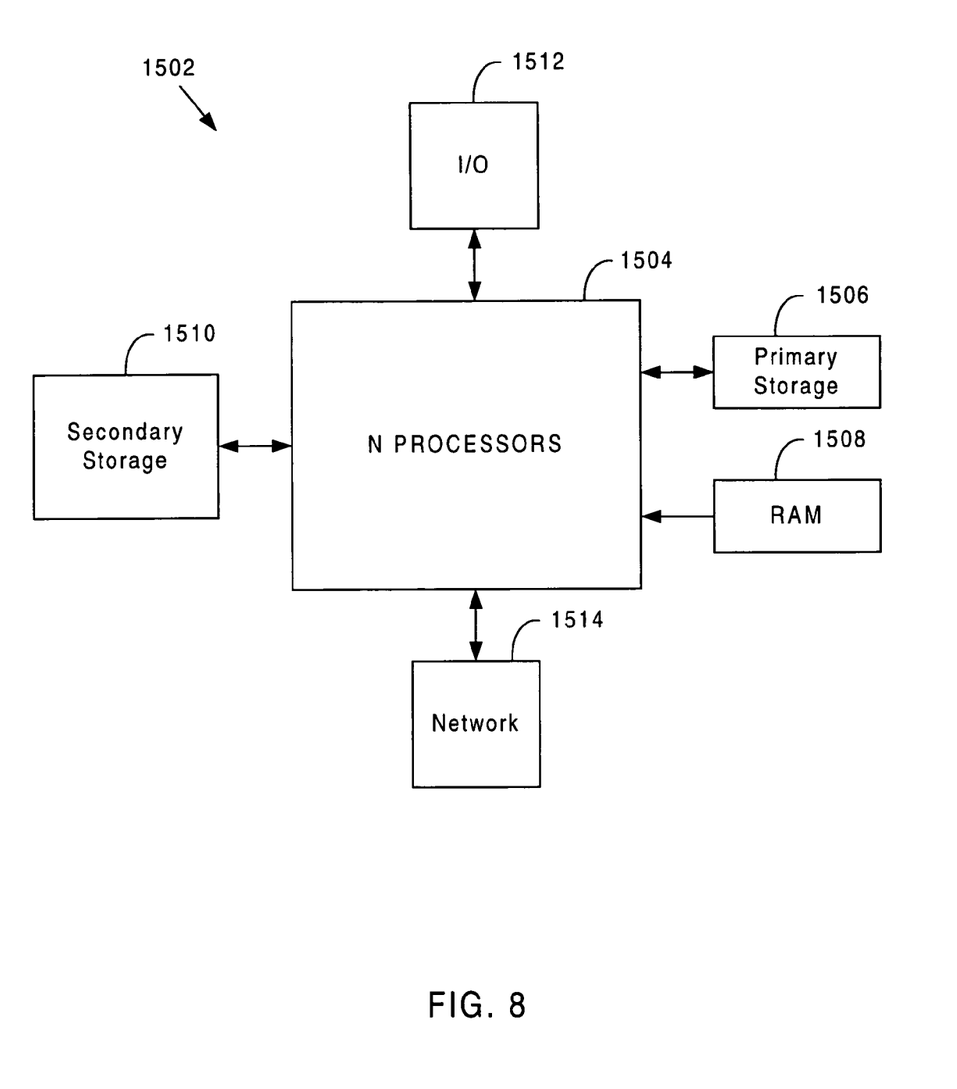
FIG. 8 is a block diagram illustrating a typical, general-purpose computer system suitable for implementing the present invention.

The present invention may be implemented on any suitable computer system. FIG. 8 illustrates a typical, general-purpose computer system 1502 suitable for implementing the present invention. The computer system may take any suitable form. For example, the computer system may be integrated with a digital television receiver or set top box.

Computer system 1502 or, more specifically, CPUs 1504, may be arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media. The CPUs 1504 may generally include any number of processors.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented within the context of a digital television receiver. However, the present invention may be used in other contexts. Moreover, although the present invention is described as being implemented on a JAVA PLATFORM, it may also be implemented on a variety of platforms. Moreover, the above described process blocks are illustrative only. Therefore, the present invention may be performed using alternate process blocks as well as alternate data structures. Accordingly, the present embodiments are to be considered as illustrative and not restrictive, and the invention is not to be limited to the details given herein, but may be modified within the scope and equivalents of the appended claims.

What is claimed is:

1. A method of identifying a data stream in a digital television receiver, comprising:
    obtaining a locator adapted for identifying a multicast IP data stream;
    associating the locator with one of a plurality of multicast IP data streams, each one of the plurality of multicast IP data streams being associated with one of a plurality of television channels;
    allocating an IP address at the receiver; and
    mapping the locator to the IP address by the receiver, thereby enabling a tuner to read the one of the plurality of multicast IP data streams associated with the locator, wherein a first set of one or more IP addresses identifies one or more network interface cards and a second set of one or more IP addresses is associated with one or more locators such that the second set of one or more IP addresses identifies one or more of the plurality of multicast IP data streams;
    reading one of the plurality of data streams identified by an IP address by a tuner upon determination that the IP address corresponds to a locator identifying a multicast IP data stream; and
    reading data from a network by a network interface card identified by an IP address upon determination that the IP address does not correspond to a locator identifying a multicast IP data stream.

2. The method as recited in claim 1, wherein allocating the IP address by the receiver comprises:
    generating the IP address by the receiver from a set of private IP addresses reserved for use in private networks prior to mapping the locator to the IP address by the receiver.

3. The method as recited in claim 1, wherein obtaining a locator comprises:
    instantiating a locator object.

4. The method as recited in claim 3, further comprising:
    garbage collecting the locator object when it is no longer used.

5. The method as recited in claim 3, wherein the plurality of multicast IP data streams are associated with two or more of the plurality of television channels.

6. The method as recited in claim 1, wherein each one of the plurality of multicast IP data streams is associated with the same one of the plurality of television channels associated with a single multicast group address.

7. The method as recited in claim 1, wherein each one of the plurality of multicast IP data streams is associated with a single tuner.

8. The method as recited in claim 1, wherein the plurality of multicast IP data streams are associated with two or more tuners.

9. The method as recited in claim 1, wherein allocating the IP address at the receiver comprises:
    allocating a private IP address at the receiver to be mapped to the locator, wherein mapping the locator to an IP address includes mapping the locator to the private IP address.

10. A method of selecting a data stream in a digital television receiver, comprising:
    obtaining a data stream locator associated with a multicast IP data stream;
    providing the data stream locator to an interface map, the interface map being adapted for mapping one or more data stream locators to one or more private IP addresses allocated for use in identifying data stream locators; and
    receiving a private IP address associated with the data stream locator from the interface map, wherein a first set of IP addresses including the private IP address is associated with one or more data stream locators such that the first set of IP addresses identifies one or more multicast IP data streams associated with one or more television channels and a second set of IP addresses identifies one or more network interface cards, thereby enabling one or more tuners to read the data streams associated with the first set of IP addresses and enabling the network interface cards identified by the IP addresses to read data from a network.

11. A method of selecting a data stream in a digital television receiver, comprising:
    obtaining an IP address;
    determining whether the IP address is a private IP address previously allocated by the digital television receiver to identify a data stream locator associated with a multicast IP data stream; and
    when it is determined that the IP address is a private IP address previously allocated by the digital television receiver to identify a data stream locator associated with a multicast IP data stream, reading the multicast IP data stream associated with the data stream locator by a tuner; and
    when it is determined that the IP address is not a private IP address previously allocated by the digital television receiver to identify a data stream locator associated with a multicast IP data stream, reading data from a network by a network interface card identified by the IP address.

12. The method as recited in claim 11, further comprising:
    instructing the tuner to read the multicast IP data stream associated with the data stream locator.

13. The method as recited in claim 12, wherein instructing the tuner to read the multicast IP data stream associated with the data stream locator comprises instructing a tuner that is tuned to a multicast group address associated with the multicast IP data stream to read the data stream associated with the data stream locator.

14. The method as recited in claim 12, wherein instructing the tuner to read the multicast IP data stream associated with the data stream locator comprises instructing a tuner that is currently unused to read the multicast IP data stream associated with the data stream locator.

15. The method as recited in claim 11, further comprising releasing the IP private address for future use when the IP address is no longer being used and the IP private address corresponds to a data stream locator associated with a multicast IP data stream.

16. The method as recited in claim 11, wherein determining whether the IP address is a private IP address previously allocated by the digital television receiver to identify to a data stream locator associated with a multicast IP data stream is performed by an interface map responsible for mapping one or more locator objects to one or more IP addresses, each one of the locator objects being associated with a multicast IP data stream, the method further comprising:
  instructing the interface map to release the private IP address for future use when the private IP address is no longer being used and the private IP address corresponds to a data stream locator associated with a multicast IP data stream.

17. A method of selecting multicast IP data transmitted in broadcast streams, comprising:
  obtaining an IP address;
  determining whether the IP address is a private IP address previously allocated by the digital television receiver to identify a data stream locator associated with a multicast IP data stream;
  specifying a multicast group address associated with the IP address;
  when it is determined that the IP address is a private IP address previously allocated by the digital television receiver to identify a data stream locator associated with a multicast IP data stream, instructing a tuner to read the multicast IP data stream associated with the data stream locator and to receive packets in the multicast IP data stream that are addressed to the multicast group address; and
  when it is determined that the IP address is not a private IP address previously allocated by the digital television receiver to identify a data stream locator associated with a multicast IP data stream, instructing a network card identified by the IP address to listen to the multicast group address.

18. The method as recited in claim 17, further comprising: receiving packets addressed to the multicast group address.

19. A method of selecting multicast IP data transmitted in broadcast streams, comprising:
  obtaining an IP address, the IP address being mapped to an associated data stream locator identifying a multicast IP data stream associated with a television channel;
  determining that the IP address is a private IP address previously allocated by the digital television receiver that is mapped to a data stream locator identifying a multicast IP data stream associated with a television channel;
  specifying a multicast group address associated with the multicast IP data stream; and
  instructing a tuner to read the data stream associated with the data stream locator and to receive packets in the multicast IP data stream that are addressed to the multicast group address when it is determined that the IP address is a private IP address previously allocated by the digital television receiver that is mapped to a data stream locator identifying a multicast IP data stream associated with a television channel.

20. A computer-readable medium storing thereon computer-readable instructions for identifying a data stream in a digital television receiver, comprising:
  instructions for obtaining a locator adapted for identifying a multicast IP data stream;
  instructions for associating the locator with one of a plurality of multicast IP data streams, each one of the plurality of multicast IP data streams being associated with one of a plurality of television channels;
  allocating an IP address at the receiver; and
  instructions for mapping the locator to the IP address at the receiver, thereby enabling a tuner to read the one of the plurality of multicast IP data streams associated with the locator, wherein a first set of one or more IP addresses identifies one or more network interface cards and a second set of one or more IP addresses is associated with one or more locators such that the second set of one or more IP addresses identifies one or more of the plurality of multicast IP data streams;
  instructions for reading one of the plurality of data streams identified by an IP address by a tuner upon determination that the IP address corresponds to a locator identifying a multicast IP data stream; and
  instructions for reading data from a network by a network interface card identified by an IP address upon determination that the IP address does not correspond to a locator identifying a multicast IP data stream.

21. An apparatus for identifying a data stream in a digital television receiver, comprising:
  means for obtaining a locator adapted for identifying a multicast IP data stream;
  means for associating the locator with one of a plurality of multicast IP data streams, each one of the plurality of multicast IP data streams being associated with one of a plurality of television channels;
  allocating an IP address at the receiver; and
  means for mapping the locator to the IP address at the receiver, thereby enabling a tuner to read the one of the plurality of multicast IP data streams associated with the locator, wherein a first set of one or more IP addresses identifies one or more network interface cards and a second set of one or more IP addresses is associated with one or more locators such that the second set of one or more IP addresses identifies one or more of the plurality of multicast IP data streams;
  means for reading one of the plurality of data streams identified by an IP address by a tuner upon determination that the IP address corresponds to a locator identifying a multicast IP data stream; and
  means for reading data from a network by a network interface card identified by an IP address upon determination that the IP address does not correspond to a locator identifying a multicast IP data stream.

22. An apparatus for identifying a data stream in a digital television receiver, comprising:

a processor; and a memory, at least one of the processor and the memory being adapted for:

obtaining a locator adapted for identifying a multicast IP data stream;

associating the locator with one of a plurality of multicast IP data streams, each one of the plurality of multicast IP data streams being associated with one of a plurality of television channels;

allocating an IP address at the receiver; and mapping the locator to IP address at the receiver, thereby enabling a tuner to read the one of the plurality of multicast IP data streams associated with the locator, wherein a first set of one or more IP addresses identifies one or more network interface cards and a second set of one or more IP addresses is associated with one or more locators such that the second set of one or more IP addresses identifies one or more of the plurality of multicast IP data streams;

reading one of the plurality of data streams identified by an IP address by a tuner upon determination that the IP address corresponds to a locator identifying a multicast IP data stream; and reading data from a network by a network interface card identified by an IP address upon determination that the IP address does not correspond to a locator identifying a multicast IP data stream.

23. A method of identifying a data stream in a digital television receiver, comprising:

allocating a private IP address by the receiver for use in identifying a multicast IP data stream; and mapping the allocated IP address by the receiver to one of a plurality of multicast IP data streams, each one of the plurality of multicast IP data streams being associated with one of a plurality of television channels, thereby enabling a tuner to read the one of the plurality of multicast IP data streams associated with the allocated IP address, wherein a first set of one or more IP addresses identifies one or more network interface cards and a second set of one or more IP addresses is associated with one or more multicast IP data streams such that the second set of one or more IP addresses identifies one or more of the plurality of multicast IP data streams;

reading one of the plurality of data streams identified by an IP address by a tuner upon determination that the IP address corresponds to a multicast IP data stream; and reading data from a network by a network interface card identified by an IP address upon determination that the IP address does not correspond to a multicast IP data stream.

24. A method of selecting a data stream in a digital television receiver, comprising:

obtaining a private IP address associated with a multicast IP data stream;

providing the private IP address to an interface map, the interface map being adapted for mapping one or more multicast IP data streams to one or more private IP addresses allocated by the digital television receiver for use in identifying multicast IP data streams; and receiving a private IP address associated with the multicast IP data stream from the interface map, wherein a first set of IP addresses including the private IP address is associated with one or more multicast IP data streams such that the first set of IP addresses identifies one or more multicast IP data streams associated with one or more television channels and a second set of IP addresses identifies one or more network interface cards, thereby enabling one or more tuners to read the data streams associated with the first set of IP addresses and enabling the network interface cards identified by the IP addresses to read data from a network.

25. A method of selecting a data stream in a digital television receiver, comprising:

obtaining an IP address;

determining whether the IP address is a private IP address previously allocated by the digital television receiver to identify a multicast IP data stream; and when it is determined that the IP address is a private IP address previously allocated by the digital television receiver to identify a multicast IP data stream, reading the multicast IP data stream associated with the IP address by a tuner; and when it is determined that the IP address is not a private IP address previously allocated by the digital television receiver to identify a multicast IP data stream, reading data from a network by a network interface card identified by the IP address.

26. A method of selecting multicast IP data transmitted in broadcast streams, comprising:

obtaining an IP address;

determining whether the IP address is a private IP address previously allocated by the digital television receiver to identify a multicast IP data stream;

specifying a multicast group address associated with the IP address;

when it is determined that the IP address is a private IP address previously allocated by the digital television receiver to identify a multicast IP data stream, instructing a tuner to read the multicast IP data stream associated with the private IP address and to receive packets in the multicast IP data stream that are addressed to the multicast group address; and when it is determined that the IP address is not a private IP address previously allocated by the digital television receiver to identify a multicast IP data stream, instructing a network card identified by the IP address to listen to the multicast group address.

27. A method of selecting multicast IP data transmitted in broadcast streams, comprising:

obtaining an IP address, the IP address being mapped to a multicast IP data stream associated with a television channel;

determining that the IP address is a private IP address previously allocated by the digital television receiver that is mapped to a multicast IP data stream associated with a television channel;

specifying a multicast group address associated with the multicast IP data stream; and instructing a tuner to read the data stream associated with the IP address and to receive packets in the multicast IP data stream that are addressed to the multicast group address when it is determined that the IP address is a private IP address previously allocated by the digital television receiver that is mapped to a multicast IP data stream associated with a television channel.

* * * * *